US009716551B2

(12) United States Patent
Wang et al.

(10) Patent No.: US 9,716,551 B2
(45) Date of Patent: Jul. 25, 2017

(54) OPTICAL AMPLIFIER WITH CLOSED LOOP CONTROL FOR SCINTILLATION COMPENSATION IN FREE SPACE OPTICAL COMMUNICATIONS

(71) Applicant: Google Inc., Mountain View, CA (US)

(72) Inventors: Chiachi Wang, Union City, CA (US); Christopher Joshua Shiro Ito, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/818,706

(22) Filed: Aug. 5, 2015

(65) Prior Publication Data
US 2017/0041074 A1 Feb. 9, 2017

(51) Int. Cl.
*H04B 10/118* (2013.01)

(52) U.S. Cl.
CPC .................................. *H04B 10/118* (2013.01)

(58) Field of Classification Search
CPC ...................................................... H04B 10/118
USPC ........................................................ 398/118
See application file for complete search history.

(56) References Cited

U.S. PATENT DOCUMENTS

| 6,122,084 A * | 9/2000 | Britz .................. H04B 10/0775 385/140 |
| 6,239,888 B1 * | 5/2001 | Willebrand ........ H04B 10/1125 398/118 |
| 8,768,166 B2 | 7/2014 | Movassaghi et al. |
| 8,918,047 B1 | 12/2014 | Teller et al. |
| 2002/0097468 A1 * | 7/2002 | Mecherle ............. H04B 10/032 398/128 |
| 2002/0131121 A1 * | 9/2002 | Jeganathan ........ H04B 10/1127 398/128 |
| 2002/0167702 A1 * | 11/2002 | Badesha ................... B64B 1/50 398/121 |
| 2004/0141752 A1 * | 7/2004 | Shelton ............. H04B 10/1127 398/120 |
| 2004/0208593 A1 * | 10/2004 | Bloom ................. H04B 10/112 398/118 |

(Continued)

FOREIGN PATENT DOCUMENTS

| WO | WO-0054413 A2 | 9/2000 |
| WO | WO-0152450 A2 | 7/2001 |
| WO | WO-03075491 | 9/2003 |

OTHER PUBLICATIONS

European Search Report for Application No. 16180771.4 dated Dec. 21, 2016.

*Primary Examiner* — Dalzid Singh
(74) *Attorney, Agent, or Firm* — Honigman Miller Schwartz and Cohn LLP

(57) ABSTRACT

A method includes receiving a first optical signal at a first communication terminal from a second communication terminal through a free space optical link and determining a receiving power for the optical link based on the first optical signal. The method further includes adjusting an output amplification at the first communication terminal based on the receiving power for the optical link. The output amplification is adjusted to provide a second optical signal with a minimum transmission power for maintaining the optical link. The method transmits the second optical signal from the first communication terminal to the second communication terminal through the optical link.

23 Claims, 10 Drawing Sheets

(56) References Cited

U.S. PATENT DOCUMENTS

| | | | |
|---|---|---|---|
| 2006/0018661 A1* | 1/2006 | Green | H04B 10/1127 398/128 |
| 2006/0024061 A1* | 2/2006 | Wirth | H04B 10/1125 398/129 |
| 2008/0225914 A1* | 9/2008 | Gurusami | H01S 3/06754 372/38.02 |
| 2013/0179008 A1* | 7/2013 | DeVaul | H04B 10/118 701/3 |
| 2014/0192340 A1* | 7/2014 | Nishikata | G01C 3/02 356/4.01 |

* cited by examiner

OPTICAL AMPLIFIER WITH CLOSED LOOP CONTROL FOR SCINTILLATION COMPENSATION IN FREE SPACE OPTICAL COMMUNICATIONS

TECHNICAL FIELD

This disclosure relates to adjusting output amplification at communication terminals to compensate for air scintillation in free space optical.

BACKGROUND

Communication terminals, such as aerial communication devices that operate at high altitudes, may transmit and receive optical signals through free space optical links. Density of the air, wind speeds, air pressure, and turbulence may cause air scintillation across optical links to fluctuate. Air scintillation may perturb one or more of the optical signals communicated between the communication terminals. For instance, air scintillation may cause a received optical power of an optical signal at a receiving one of the communication terminals to decrease from a transmission power of the optical signal at a transmitting one of the communication terminals. As a result, optical link loss may occur and data included in the optical signals may not be received by the receiving communication terminal or partially received by the receiving communication terminal. While selecting a high transmission power for the optical signals may overcome the implications when air scintillation is high, using high transmission powers for the optical signals when the air scintillation is low may cause damage to the receiving optics at the receiving communication terminals and power consumption unduly increases at the communication terminals.

SUMMARY

One aspect of the disclosure provides a method for operating an optical amplifier. The method includes receiving, at a first communication terminal, a first optical signal from a second communication terminal through a free space optical link and determining, by control hardware of the first communication terminal, a receiving power for the optical link based on the first optical signal. The method also includes adjusting, by the control hardware, an output amplification at the first communication terminal based on the receiving power for the optical link and transmitting the second optical signal from the first communication terminal to the second communication terminal through the optical link. The output amplification is adjusted to power a second optical signal with a minimum transmission power for maintaining the optical link.

Implementations of the disclosure may include one or more of the following optional features. In some implementations, determining the receiving power for the optical link is based on an optical power of the first optical signal when the first communication terminal receives the first optical signal. Determining the receiving power for the optical link may be further based on ail error rate of data packets associated with the first optical signal.

In some examples, when receiving the first optical signal, the method includes receiving a telemetry signal at the first communication terminal from the second communication terminal through the optical link and determining, by the control hardware, the receiving power for the optical link based on the telemetry signal providing the receiving power for the optical link at the second communication terminal. The telemetry signal may provide the receiving power for the optical link at the second communication terminal. When receiving the first optical signal, the method may further include receiving a laser diode signal at the first communication terminal from a laser diode of the second communication terminal through the optical link and determining, by the control hardware, a received power of the laser diode signal. The method may also include determining, by the control hardware, the receiving power for the optical link based on the received power of the laser diode signal. In some implementations, the second communication terminal transmits the laser diode signal from the laser diode at a constant output power. In these implementations, when the received power of the laser diode signal differs from the constant output power of the laser diode, the method may include adjusting, by the control hardware, the output amplification at the first communication terminal by an amount based on the difference between the received power of the laser diode signal and the constant output power of the laser diode. The second communication terminal may transmit the laser diode signal from the laser diode at a wavelength outside a gain bandwidth associated with the first optic signal.

When transmitting the second optical signal from the first communication terminal to the second communication terminal, the method may include transmitting a telemetry signal from the first communication terminal to the second communication terminal through the optical link. The telemetry signal may provide the receiving power for the optical link at the first communication terminal based on at least one of a received optical power of the first optical signal or an error rate of data packets associated with the first optical signal. The telemetry signal may include a dedicated channel different than a signal channel associated with the second optical signal. The telemetry signal and the second optical signal may be co-propagated through an optical amplifier at the first communication terminal prior to transmitting the second optical signal and the telemetry signal to the second communication terminal.

In some examples, adjusting the output amplification at the first communication terminal includes, when the receiving power for the optical link is less than a threshold receiving power, increasing the output amplification at the first communication terminal to increase the receiving power for the optical link when the second communication terminal receives the second optical signal. When the receiving power for the optical link is greater than the threshold receiving power, the method may include decreasing the output amplification at the first communication terminal to decrease the receiving power for the optical link when the second communication terminal receives the second optical signal. Decreasing the output amplification may include decreasing the output amplification at a rate that avoids oscillations when the first communication terminal transmits the second optical signal. The first communication terminal or the second communication terminal may include a high-altitude platform. The first communication terminal and the second communication terminal may operate at a common altitude above the earth while maintaining a link of sight between each other.

Another aspect of the disclosure provides a high altitude platform including receiver optics, transmitter optics and communication hardware. The receiver optics are configured to receive a first optical signal from another high altitude platform through a free space optical link. The transmitter optics are configured to transmit a second optical signal to the other high altitude platform through the optical link. The control hardware is in communication with the receiver optics and the transmitter optics. The control hardware is configured to determine a receiving power for the optical link based on the first optical signal and adjust an output amplification at the transmitter optics based on the receiving power for the optical link. The output amplification is adjusted to provide the second optical signal with a minimum transmission power for maintaining the optical link.

This aspect may include one or more of the following optional features. In some examples, the control hardware determines the receiving power for the optical link based on at least one of an optical power of the first optical signal when the receiver optics receive the first optical signal or an error packet of data packets associated with the first optical signal when the receiver optics receive the first optical signal. The receiver optics, when receiving the first optical signal, may be configured to receive a telemetry signal from the other high altitude platform through the optical link. The telemetry signal may provide the receiving power for the optical link at the other high altitude platform. The control hardware may be configured to determine the receiving power for the optical link based on the receiving power for the optical link at the other high altitude platform. The receiver optics, when receiving the first optical signal, may be further configured to receive a laser diode signal from a laser diode of the high altitude platform through the optical link. The control hardware may be further configured to determine a received power of the laser diode signal and determine the receiving power for the optical link based on the received power of the laser diode signal.

In some examples, the high altitude platform includes an optical amplifier in communication with the control hardware and the transmitter optics. The optical amplifier may be configured to adjust the output amplification at the high altitude platform by an amount based on a difference between the received power of the laser diode signal and a constant output power of the laser diode signal when the laser diode at the other high altitude platform transmits the laser diode signal. When transmitting the second optical signal to the other high altitude platform, the transmitter optics may transmit a telemetry signal to the other high altitude platform through the optical link. The telemetry signal may provide the receiving power for the optical link at the high altitude platform based on at least one of a received optical power of the first optical signal or an error rate of data packets associated with the first optical signal. The high altitude platform may further include a telemetry transmitter in communication with the control hardware and the transmitter optics. The telemetry transmitter may provide the telemetry signal with a dedicated channel different than a signal channel associated with the second optical signal.

In some implementations, the high altitude platform includes an optical amplifier in communication with the control hardware and the transmitter optics. The optical amplifier may be configured to co-propagate the telemetry signal and the second optical signal prior to the transmitter optics transmitting the telemetry signal and the second optical signal to the other high altitude platform. The high altitude platform may further include an optical amplifier in communication with the control hardware and the transmitter optics. The optical amplifier may be configured to, when the receiving power for the optical link is less than a threshold receiving power, increase the output amplification at the transmitter optics to increase the receiving power for the optical link when the other high altitude platform receives the second optical signal. The optical amplifier may be further configured to, when the receiving power for the optical link is greater than the threshold receiving power, decrease the output amplification at the transmitter optics to decrease the receiving power for the optical link when the other high altitude platform receives the second optical signal. The optical amplifier may also be configured to decrease the output amplification at a rate that avoids oscillations when the transmitter optics transmit the second optical signal.

Yet another aspect of the disclosure provides a communication system including a first communication terminal. The first communication terminal includes first receiver optics configured to receive a first optical signal through a free space optical link, first transmitter optics configured to transmit a second optical signal through the optical link, and first control hardware in communication with the first receiver optics and the first transmitter optics. The first control hardware is configured to determine a receiving power for the optical link based on the first optical signal and adjust an output amplification at the first transmitter based on the receiving power for the optical link. The output amplification is adjusted to provide the second optical signal with a minimum transmission power for maintaining the optical link. The communication system also includes a second communication terminal including second receiver optics configured to receive the second optical signal from the first transmitter optics through the optical link, second transmitter optics configured to transmit the first optical signal to the first receiver optics through the optical link, and second control hardware in communication with the first receiver optics and the first transmitter optics. The second control hardware is configured to determine a receiving power for the optical link based on the second optical signal and adjust an output amplification at the second transmitter optics based on the receiving power for the optical link. The output amplification is adjusted to provide a subsequent optical signal for transmission from the second transmitter optics with a minimum transmission power for maintaining the optical link.

This aspect may include one or more of the following optional features. In some examples, at least one of the first or second control hardware determines the receiving power for the optical link based on at least one of: an optical power of the associated one of the first or second optical signals when the associated one of the first or second receiver optics receives the associated one of the first or second optical signals, or an error packet rate of data associated with the associated one of the first or second optical signals when the associated one of the first or second receiver optics receives the associated one of the first or second optical signals. One of the first or second receiver optics of the associated one of the first or second communication terminals, when receiving the associated one of the first or second optical signals, may be configured to receive a telemetry signal from the other one of the first or second communication terminals through the optical link. The telemetry signal may provide the receiving power for the optical link at the other one of the first or second communication terminals. One of the first or second control hardware associated with the one of the first or second receiver optics that receives the telemetry signal may be configured to determine the receiving power for the optical link based on the receiving power for the optical link at the other one of the first or second communication terminals.

In some examples, one of the first or second receiver optics of the associated one of the first or second communication terminals, when receiving the associated one of the first or second optical signals, is configured to receive a laser diode signal from a laser diode of the other one of the first or second communication terminals. One of the first or second control hardware associated with the one of the first or second receiver optics that receives the laser diode signal may be configured to determine a received power of the laser diode signal and determine the receiving power for the optical link based on the received power of the laser diode signal. The first and second communication terminals may include high altitude platforms operating at a common altitude above the earth while maintaining a line of sight between each other.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
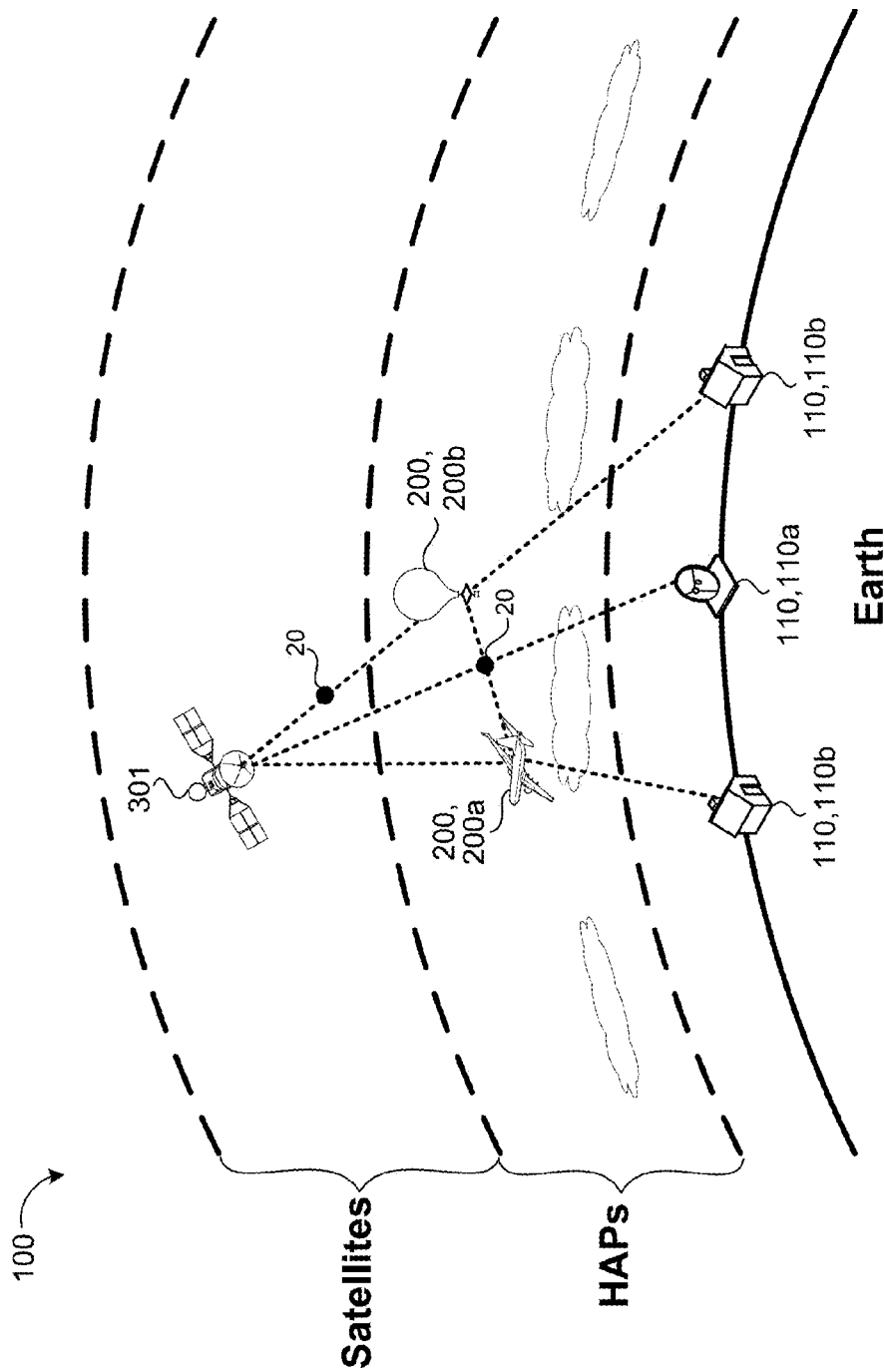
FIG. 1 is a schematic view of an example communication system.

Referring to FIG. 1, in some implementations, a global-scale communication system 100 includes gateways 110 (e.g., source ground stations 110a and destination ground stations 110b), high altitude platforms (HAPs) 200, and satellites 301. The source ground stations 110a may communicate with the satellites 301, the satellites 301 may communicate with the HAPs 200, and the HAPs 200 may communicate with one another and with the destination ground stations 110b. In some examples, the source ground stations 110a also operate as linking-gateways between the satellites 301. The source ground stations 110a may be connected to one or more service providers and the destination ground stations 110b may be user terminals (e.g., mobile devices, residential WiFi devices, home networks, etc.). In some implementations, the HAPs 200 include aerial communication devices that operate at high altitudes (e.g., 17-22 km). Each HAP 200 may be released into the earth's atmosphere, e.g., by an air craft, or flown to the desired altitude. Moreover, the HAP 200 may operate as a quasi-stationary aircraft. In some examples, the HAP 200 is an aircraft 200a, such as an unmanned aerial vehicle (UAV); while in other examples, the HAP 200 is a communication balloon 200b. The HAP 200 may receive a communication 20 from one of the satellites 301 and reroute the communication 20 to another HAP 200 or one of the destination ground stations 110b. The satellite 301 may be in Low Earth Orbit (LEO), Medium Earth Orbit (MEG), or High Earth Orbit (HEO), including Geosynchronous Earth Orbit (GEO).

Figure 2B:
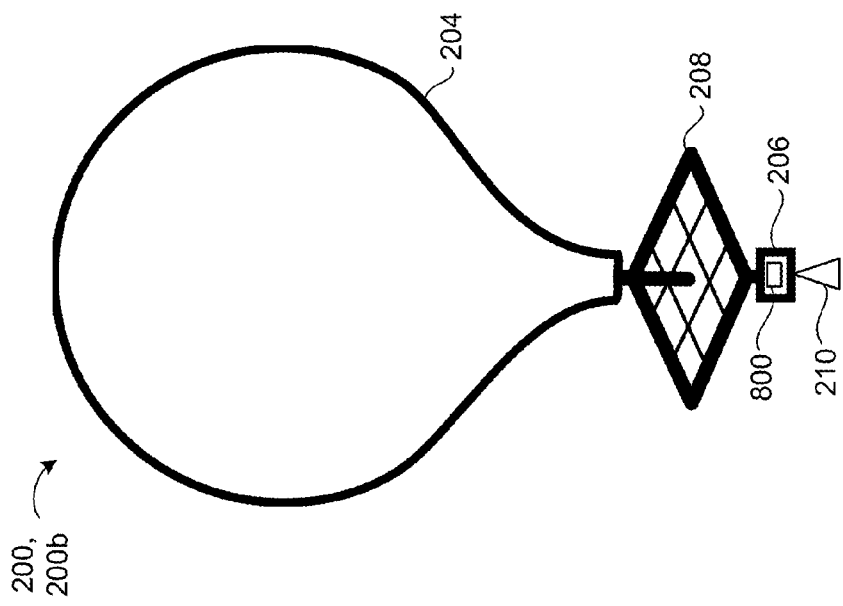
FIGS. 2A and 2B are perspective views of example high-altitude platforms.
Figure 2A:
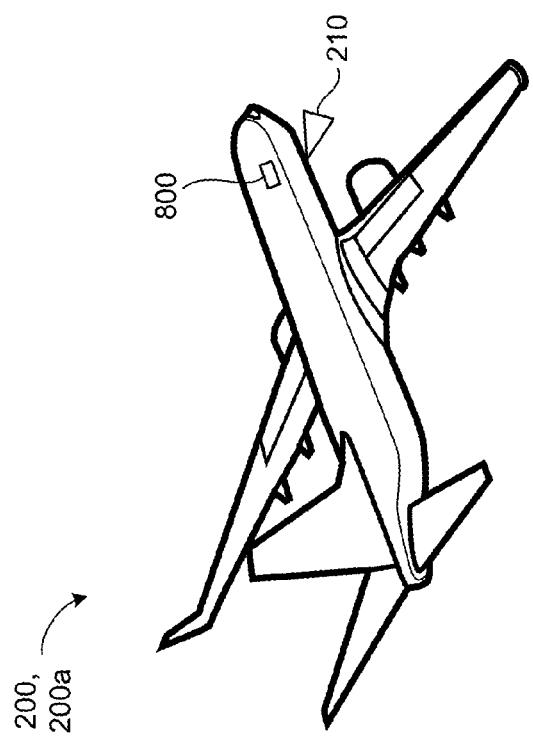

Referring to FIGS. 2A, and 2B, in some implementations, the HAP 200 includes a transceiver 210 that receives the communication 20 from the satellite 301 or another HAP 200 and transmits the communication 20 to the destination ground station 110b or another HAP 200. The HAP 200 may include control hardware 800 that processes the received communication 20 and determines a path of the communication 20 to arrive at the destination ground station 110b or the other HAP 200. In some implementations, one or more of the HAPs 200 are capable of communicating with one another by transmitting optical signals 320 (FIG. 3) through a free space optical link 322 (FIG. 3).

FIG. 2B illustrates an example communication balloon 200b that includes a balloon 204 (e.g., sized about 49 feet in width and 39 feet in height and filled with helium or hydrogen), an equipment box 206, and solar panels 208. The equipment box 206 includes control hardware 800 that executes algorithms to determine a target location for the high-altitude balloon 200b, thereby allowing each high-altitude balloon 200b to move into a layer of wind blowing in a direction to take the balloon 200b to the target location. The equipment box 206 also includes batteries to store power and the transceiver 210 to communicate with other devices (e.g., other HAPs 200, satellites 301, gateways 110, such as user terminals 110b, internet antennas on the ground, etc.). The solar panels 208 may power the equipment box 206.

Communication balloons 200b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 200b float in the stratosphere at an altitude twice as high as airplanes and the weather (e.g., 20 km above the earth's surface). The high-altitude balloons 200b are carried around the earth by winds and can be steered by rising or descending to an altitude with winds moving in the desired direction. Winds in the stratosphere are usually steady and move slowly from about 5 mph to about 20 mph, and each layer of wind varies in direction and magnitude.

Figure 3:
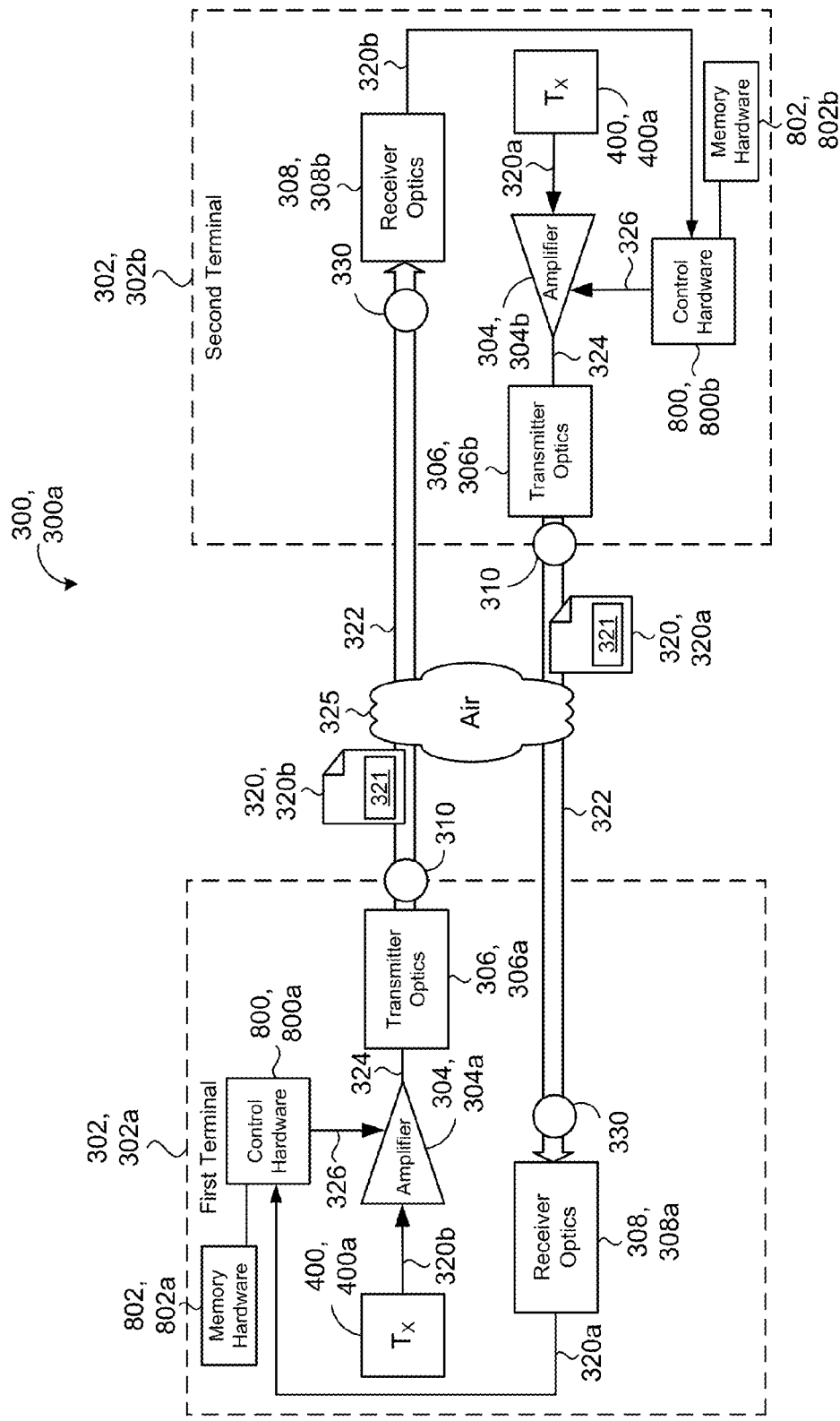
FIG. 3 is a schematic view of an example communication system providing optical signals through a free space optical link between a first communication terminal and a second communication terminal.

Referring to FIG. 3, in some implementations, a communication system 300 300a provides optical signals 320, 320a-b between a first communication terminal 302a (hereinafter 'first terminal 302a') and a second communication terminal 302b (hereinafter 'second terminal 302b') through the free space optical link 322. The optical signals 320 may include data 321, such as internet packets, being routed through the global-scale communication system 100. In some implementations, the terminals 302 include HAPs 200 operating at high altitudes (e.g., 17-22 km) within the Earth's atmosphere, thereby requiring the optical signals 320 to pass through air 325. Each terminal 302*a*, 302*b* may include a transmitter module 400, 400*a-b*, an optical amplifier 304, 304*a-b*, transmitter optics 306, 306*a-b*, receiver optics 308, 308*a-b*, the control hardware 800, 800*a-b*, and memory hardware 802, 802*a-b*. The memory hardware 802 stores information, such as instructions executable by the control hardware 800, non-transitorily at the control hardware 800. The memory hardware 802 may be a computer-readable medium, a volatile memory unit(s), or non-volatile memory unit(s). The memory hardware 802 may be physical devices used to store programs (e.g., sequences of instructions) or data (e.g., program state information) on a temporary or permanent basis for use by the control hardware 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes. The control hardware 800 can be, for example, a processor executing computer-readable instructions stored in the memory hardware 802, a field programmable gate array (FGPA), a digital signal processor (DSP), or any other suitable circuitry.

In some implementations, scintillation of the air 325 perturbs one or more of the optical signals 320 communicated between the terminals 302 via the optical link 322. For instance, air scintillation may cause a received optical power 330 of the optical signal 320 at a receiving one of the terminals 302 to decrease from a transmission power 310 of the optical signal 320 at a transmitting one of the terminals 302. In some examples, a drastic decrease in the received optical power 330 from the transmission power 310 indicates a loss of the optical link 322. Optical link loss may result in the receiving one of the terminals 302 failing to receive some or all of the data. 321 within the optical link 322. Additionally or alternatively, loss of the optical link 322 may occur when the received optical power 330 is less than a desired received optical power for maintaining the optical link 322.

Air scintillation may increase with longer separation distances between the terminals 302*a*, 302*b*, higher density of the air 325, higher wind speeds, higher air pressure, and/or higher turbulence. Accordingly, the air scintillation dynamically effects the communication of the optical signals 320 between the terminals 302 via the optical link 322. While higher transmission powers 310 may be selected to overcome the foregoing implications caused when the air scintillation is high or severe, constantly using high transmission powers 310 may saturate a photo receiver associated with the receiver optics 308 at the receiving one of the terminals 302 and/or unduly increase power consumption at the terminals 302 when the air scintillation becomes low or is no longer severe.

The transmitter optics 306 may transmit the optical signals 320 and the receiver optics 308 may receive the optical signals 320 to establish the optical link 322. For instance, the transmitter optics 306*b* at the second terminal 302*b* may transmit a first optical signal 320*a* to the receiver optics 308*a* at the first terminal 302*a* to establish the optical link 322. Similarly, the transmitter optics 306*a* at the first terminal 302*a* may transmit a second optical signal 320*b* to the receiver optics 308*b* at the second terminal 302*b* to establish the optical link 322. The receiver optics 308 may include, but are not limited to, an optical pre-amplifier, photodiodes, the photo receiver, transimpedance amplifiers, clock/phase recovery circuits, decision circuits, and/or forward error correction circuits to convert the optical signals 320 into electrical binary bits to interpret the data 321. The transmitter module 400 may provide the optical signal 320 to the optical amplifier 304 to adjust a gain or output amplification 324 of the optical signal 320 based upon a receiving power 326 for the optical link 322. The control hardware 800 may be in communication with the receiver optics 308 and the optical amplifier 304. In some implementations, the control hardware 800 determines the receiving power 326 for the optical link 322 based upon the optical signal 320 last received by the associated receiver optics 308 and provides the receiving power 326 to the optical amplifier 304. Accordingly, the control hardware 800 may provide closed loop control for the optical amplifier 304 to adjust the output amplification 324 at the associated terminal 302 based upon the receiving power 326 for the optical link 322 to provide a subsequently transmitted optical signal 320 with a minimum transmission power 310 for maintaining the optical link 322.

In some implementations, the transmitter optics 306*b* at the second terminal 302*b* transmit the first optical signal 320*a* over the optical link 322 to the receiver optics 308*a* at the first terminal 302*a*. Without knowledge of the scintillation of the air 325, the second terminal 302*b* assumes that the transmission power 310 for the first optical signal 320*a* is sufficient for transmission through the optical link 322 to the receiver optics 308*a* at the first terminal 302*a* without incurring optical link loss. Upon receiving the first optical signal 320*a*, the receiver optics 308*a* at the first terminal 302*a* may provide the optical signal 320*a*, or information associated with optical signal 320*a*, to the control hardware 800*a* for determining the receiving power 326 for the optical link 322. In some implementations, the optical amplifier 304*a* adjusts the output amplification 324 at the first terminal 302*a* based upon the receiving power 326 for the optical link 322. For example, when the receiving power 326 is less than a threshold receiving power, the optical amplifier 304*a* may increase the output amplification 324 at the first terminal 302*a* to provide the second optical signal 320*b* with the minimum transmission power 310 for maintaining the optical link 322. The increase in the output amplification 324 at the first terminal 302*a* causes the receiving power 326 for the optical link 322 at the second terminal 302*b* to increase when the second terminal 302*b* receives the second optical signal 320*b*. In some examples, the optical amplifier 304*a* increases the output amplification 324 at a fastest rate permissible by the optical amplifier 304.

Conversely, when the receiving power 326 is greater than the threshold receiving power, the optical amplifier 304*a* may decrease the output amplification 324 at the first terminal 302*a* to provide the second optical signal 320*b* with the minimum transmission power 310 for maintaining the optical link 322. Thereafter, the transmitter optics 306*a* may receive the second optical signal 320*b* from the optical amplifier 304*a* and transmit the second optical signal 320*b* through the optical link 322 to the receiver optics 308*b* at the second terminal 302*b*. The decrease in the output amplification 324 at the first terminal 302*a* causes the receiving power 326 for the optical link 322 at the second terminal 302*b* to decrease when the second terminal 302*b* receives the second optical signal 320*b*. In some examples, when decreasing the output amplification 324, the optical amplifier 304a decreases the output amplification 324 at a rate that avoids oscillations when the first terminal 302a transmits the second optical signal 320b. The control hardware 800b at the second terminal 302b may similarly determine the receiving power 326 for the optical link 322 when the second terminal 302b receives the second optical signal 320b and the optical amplifier 304b may adjust the output amplification 324 at the second terminal 302b to provide a subsequently transmitted optical signal 320 with the minimum transmission power 310 for maintaining the optical link 322.

Figure 4:
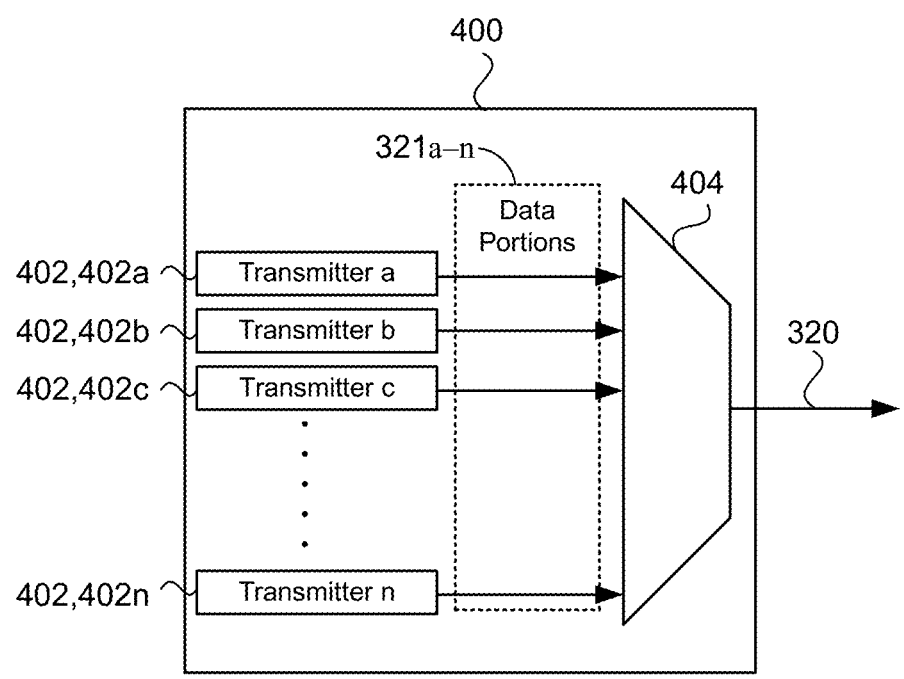
FIG. 4 is a schematic view of an example transmitter module including a wavelength division multiplexer.

Referring to FIG. 4, in some implementations, the transmitter module 400 may include one or more transmitters 402, 402a-n each transmitting portions of the data 321a-n to a wavelength division multiplexer 404 (hereinafter 'WDM 404'). In some examples, the transmitters 402 include optical transmitters that transmit optical signals including associated portions of the data 321a-n. The WDM 404 may multiplex the data portions 321a-n to propagate the optical signal 320 with the data 321. In some examples, the WDM 404 provides the optical signal 320 with a dedicated channel for transmission over the optical link 322.

Figure 5:
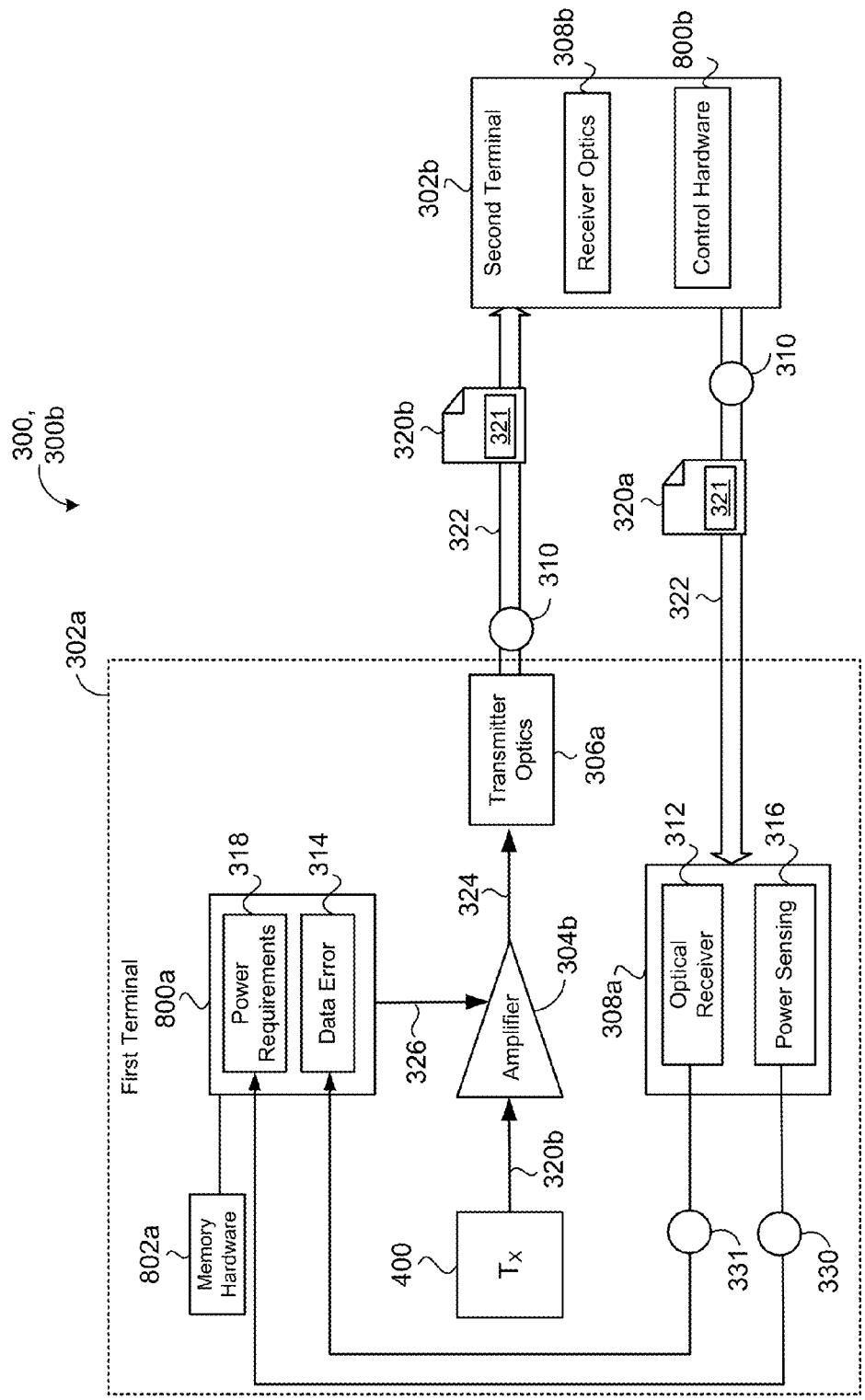
FIG. 5 is a schematic view of an example communication system providing optical signals through a free space optical link between a first communication terminal and a second communication terminal.

Referring to FIG. 5, in some implementations, a communications system 300, 300b provides the optical signals 320 between the first terminal 302a and the second terminal 302b through the free space optical link 322. In some implementations, an optical receiver 312 and a power sensing module 316 are associated with each of the receiver optics 308a, 308b and a data error module 314 and a power requirements module 318 are associated with the control hardware 800a, 800b at each of the terminals 302.

The optical receiver 312 may convert the optical signals 320 into electrical binary bits to interpret the data 321 associated with the optical signals 320. In some examples, the optical receiver 312 determines a received number of packets 331 associated with the data 321 when the optical receiver 312 receives the optical signal 320. In these examples, the optical receiver 312 provides the number of received data packets 331 to the data error module 314 at the control hardware 800. The data error module 314 may determine an error packet rate when the received number of data packets 331 is less than a total number of packets associated with the data 321. In some examples, the control hardware 800 determines the receiving power 326 for the optical link 322 based upon the presence of the error packet rate of the data 321 associated with the optical signal 320. Accordingly, the optical amplifier 304 may increase the output amplification 324 based on the error packet rate of the data 321 associated with the optical signal 320.

The power sensing module 316 may determine the received optical power 330 of the optical signal 320 when the receiving one of the terminals 302 receives the optical signal 320. The power sensing module 316 may provide the received optical power 330 to the power requirements module 318. In some implementations, the power requirements module 318 determines the receiving power 326 for the optical link 322 based upon the received optical power 330 of the optical signal 320. Thereafter, the optical amplifier 304 may adjust the output amplification 324 to provide a subsequent optical signal 320 with the minimum transmission power 310 for maintaining the optical link 322. For instance, the optical amplifier 304 may increase the output amplification 324 when the receiving power 326 for the optical link 322 is less than the threshold receiving power or the optical amplifier 304 may decrease the output amplification 324 when the receiving power 326 exceeds the threshold receiving power.

In some implementations, the transmitter optics 306b at the second terminal 302b transmits the first optical signal 320a through the optical link 322 to the receiver optics 308a at the first terminal 302a. In some examples, the power sensing module 316 determines the received optical power 330 of the first optical signal 320a and provides the received optical power 330 to the power requirements module 318 at the control hardware 800a for determining the receiving power 326 for the optical link 322. In scenarios when the received optical power 330 is less than a threshold received optical power, the power requirements module 318 determines the receiving power 326 is less than the threshold receiving power, and thus, insufficient for maintaining the optical link 322. In these scenarios, the optical amplifier 304a may increase the output amplification 324 at the first terminal 302a to increase the minimum transmission power 310 for maintaining the optical link 322 when the transmitter optics 306a transmit the second optical signal 320b to the second terminal 302b. Accordingly, increasing the output amplification 324 at the first terminal 302a causes an increase in the receiving power 326 for the optical link 322 at the second terminal 302b to compensate for the air scintillation.

Conversely, in scenarios when the received optical power 330 is greater than the threshold received optical power, the power requirements module 318 may determine the receiving power 326 is greater than the threshold receiving power. In some examples, reductions in the air scintillation cause the received optical power 330 to exceed the threshold receiving power. As a result, the receiving power 326 for the optical link 322 may become excessive, and may therefore cause damage to the receiver optics 308 and/or unduly increase power consumption at the terminals 302. In these scenarios, the optical amplifier 304a may decrease the output amplification 324 at the first terminal 302a to reduce the receiving power 326 for the optical link 322 at the second terminal 302b to account for reductions in the air scintillation.

In some examples, the optical receiver 312 determines the received number of packets 331 associated with the data 321 of the first optical signal 320a and provides the received number of packets 331 to the data error module 314 at the control hardware 800a for determining the receiving power 326 for the optical link 322. In some implementations, when the data error module 314 determines the presence of the error packet rate of the data 321, the data error module 314 determines the receiving power 326 is insufficient for maintaining the optical link 322. In these implementations, the optical amplifier 304a may increase the output amplification 324 at the first terminal 302a to increase the minimum transmission power 310 for maintaining the optical link 322 when the transmitter optics 306a transmit the second optical signal 320b to the second terminal 302b. That is, by increasing the output amplification 324 at the first terminal 302a, the receiving power 326 for the optical link 322 increases at the second terminal 302b to compensate for the effects caused by the air scintillation. In some examples, the optical amplifier 304a increases the output amplification 324 by a magnitude based on the error packet rate of the data 321. While the presence of the error packet rate may be used for identifying when the receiving power 326 is insufficient for maintaining the optical link 322, an absence of the error packet rate, however, will only indicate that the receiving power 326 is sufficient for maintaining the optical link 322. Thus, based upon the absence of the error packet rate alone, the control hardware 800 is unable to determine whether the receiving power 326 is or has become excessive due to reductions in the air scintillation.

In some implementations, the control hardware 800a, 800b associated with the communications system 300b of FIG. 5 assumes that the first terminal 302a and the second terminal 302b are reciprocal with each other. As used herein, the first terminal 302a and the second terminal 302b are reciprocal with each other when the terminals 302 operate at a common altitude above the earth while maintaining a line of sight between each other. Generally, the air density and the air pressure remains substantially constant across the optical link 322 when the first terminal 302a and the second terminal 302b are reciprocal with each other and/or operate at high altitudes above the earth where the air 325 is thin. Accordingly, when the terminals 302 are reciprocal with each other, the control hardware 800 may adjust the output amplification 324 at the transmitting one of the terminals 302 based upon the optical signal 320 last received to regulate the receiving power 326 for the optical link 322 at the receiving one of the terminals 302, and vice versa. Conversely, when the terminals 302a, 302b are not reciprocal, the air scintillation may affect the receiving power 326 for the optical link 322 at each of the terminals 302 differently.

Figure 6:
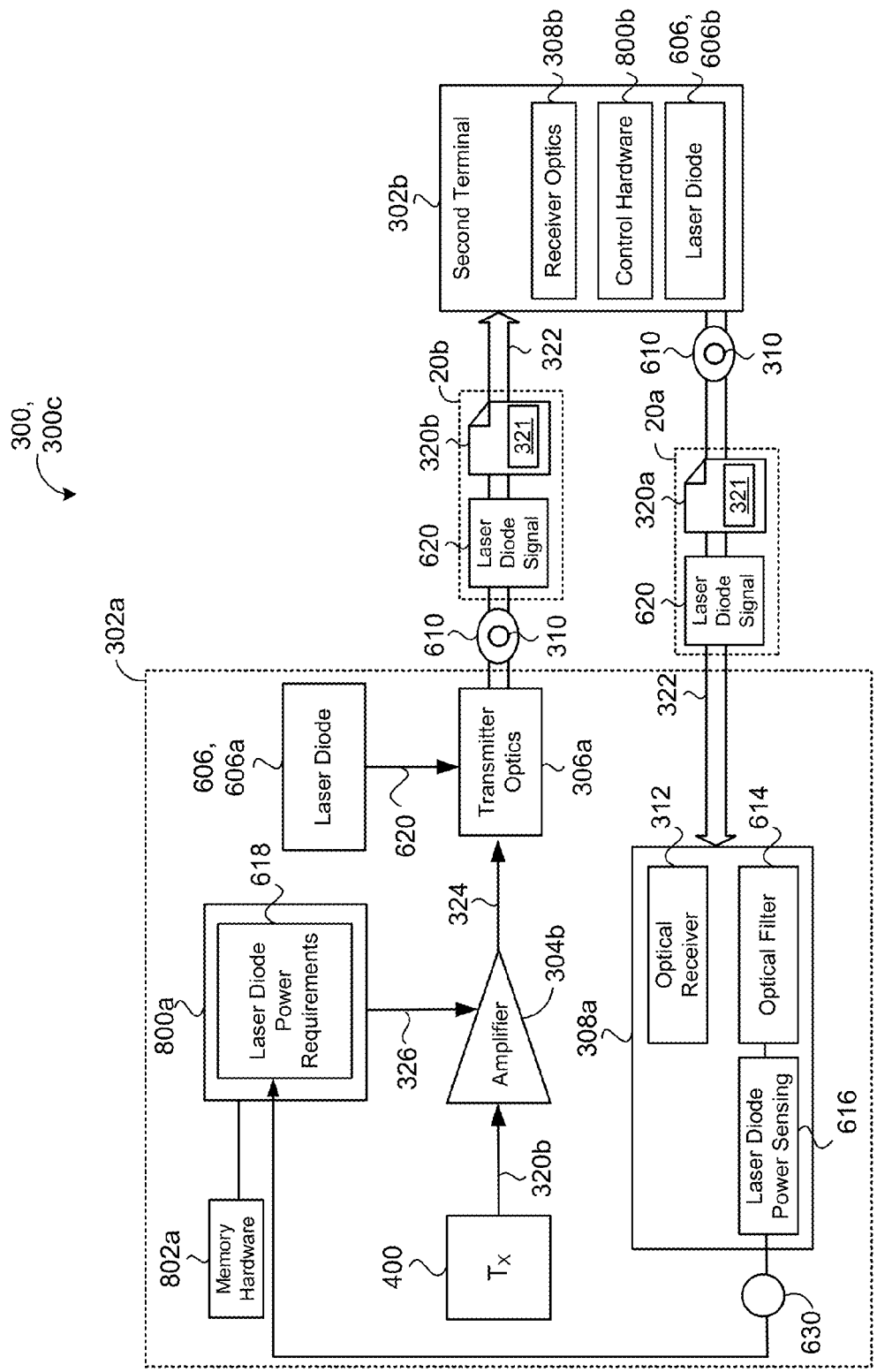
FIG. 6 is a schematic view of an example communication system providing optical signals and laser diode signals through a free space optical link between a first communication terminal and a second communication terminal.

Referring to FIG. 6, in some implementations, a communications system 300, 300c provides the communications 20 between the first terminal 302a and the second terminal 302b through the free space optical link 322. Each communication 20 may include a laser diode signal 620 and the optical signal 320. In some implementations, the optical receiver 312, an optical filter 614, and a laser diode power sensing module 616 are associated with each of the receiver optics 308a, 308b and a laser diode power requirements module 618 is associated with the control hardware 800a, 800b at each of the terminals 302a, 302b. The first terminal 302a and the second terminal 302b of the communication system 300c may each also include a laser diode 606, 606a-b. In some implementations, the laser diode 606 transmits the laser diode signal 620 to the transmitter optics 306 at the transmitting one of the terminals 302 for transmitting the communication 20 that collectively includes the laser diode signal 620 and the optical signal 320 through the optical link 322 to the receiving one of the terminals 302. In some examples, the transmitting one of the terminals 302 transmits the laser diode signal 620 at a constant output power 610. Additionally, the transmitting one of the terminals 302 may transmit the laser diode signal 620 at a wavelength outside a gain bandwidth associated with the optical signal 320.

The optical receiver 312 may convert the optical signals 320 into electrical binary bits to interpret the data 321 associated with the optical signals 320. In some implementations, when the receiving one of the terminals 302 receives the communication 20 from the transmitting one of the terminals 302, the optical filter 614 filters the laser diode signal 620 from the optical signal 320 and provides the laser diode signal 620 to the laser diode power sensing module 616. In some examples, the laser diode power sensing module 616 determines a received power 630 of the laser diode signal 620 and provides the received power 630 to the laser diode power requirements module 618. In some implementations, the laser diode power requirements module 618 correlates the received power 630 of the laser diode signal 620 to the receiving power 326 for the optical link 322. Accordingly, the laser diode power requirements module 618 may determine the receiving power 326 for the optical link 322 and the optical amplifier 304 may adjust the output amplification 324 to provide the minimum transmission power 310 for maintaining the optical link 322, and thus, regulate the receiving power 326 for the optical link 322 at the other terminal 302. The optical amplifier 304 may adjust the output amplification 324 by an amount corresponding to the difference between the received power 630 of the laser diode signal 620 and the constant output power 610 provided by the laser diode 606 at the other terminal 302.

In some implementations, the transmitter optics 306b at the second terminal 302b transmits a first communication 20a including the first optical signal 320a and the laser diode signal 620 through the optical link 322 to the receiver optics 308a at the first terminal 302a. In some examples, the optical filter 614 filters the laser diode signal 620 from the first communication 20a and the laser diode power sensing module 616 determines the received power 630 of the laser diode signal 620. The laser diode power requirements module 618 at the control hardware 800a may determine the receiving power 326 for the optical link 322 based upon the received power 630 of the laser diode signal 620. For instance, the received power 630 falling from the constant output power 610 of the laser diode signal 620 may indicate a decrease in the receiving power 326 for the optical link 322. In some examples, when the constant output power 610 exceeds the received power 630 by a laser diode power threshold, the laser diode power requirements module 618 determines the receiving power 326 is less than the threshold receiving power, and thus, insufficient for maintaining the optical link 322. In these examples, the optical amplifier 304a may increase the output amplification 324 at the first terminal 302a to increase the receiving power 326 for the optical link 322 at the second terminal 302b to compensate for the air scintillation when the second terminal 302b receives the second optical signal 320b. FIG. 6 shows the transmitter optics 306a at the first terminal 302a transmitting a second communication 20b that includes the laser diode signal 620 and the second optical signal 320b to the second terminal 302b through the optical link 322.

As with the communications system 300b of FIG. 5, the communication system 300c assumes that the first terminal 302a and the second terminal 302b are reciprocal with each other when determining the receiving power 326 for the optical link 322 at the receiving one of the terminals 302 based upon the received power 630 of the laser diode signal 620 from the transmitting one of the terminals 302. Accordingly, when the terminals 302 are reciprocal with each other, the control hardware 800 may adjust the output amplification 324 at the transmitting one of the terminals 302 based upon the received power 630 for the laser diode signal 620 last received to regulate the receiving power 326 for the optical link 322 at the receiving one of the terminals 302, and vice versa. Conversely, when the terminals 302a, 302b are not reciprocal, the air scintillation may affect the received power 630 for the laser diode signal 620 and the receiving power 326 for the optical link 322 at each of the terminals 302 differently.

Figure 7A:
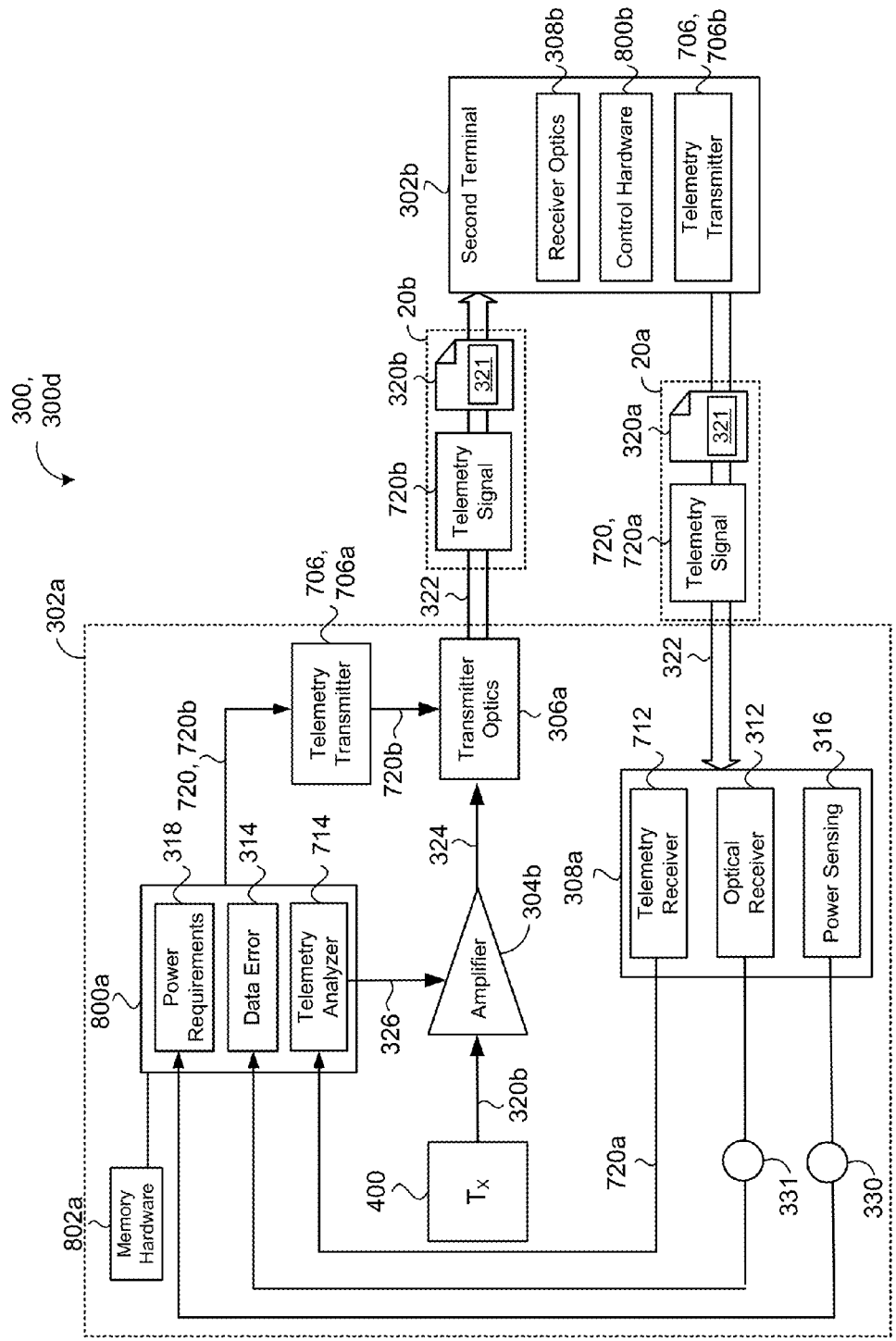
FIGS. 7A and 7B are schematic views of example communication systems providing optical signals and telemetry signals through a free space optical link between a first communication terminal and a second communication terminal.
Figure 7B:
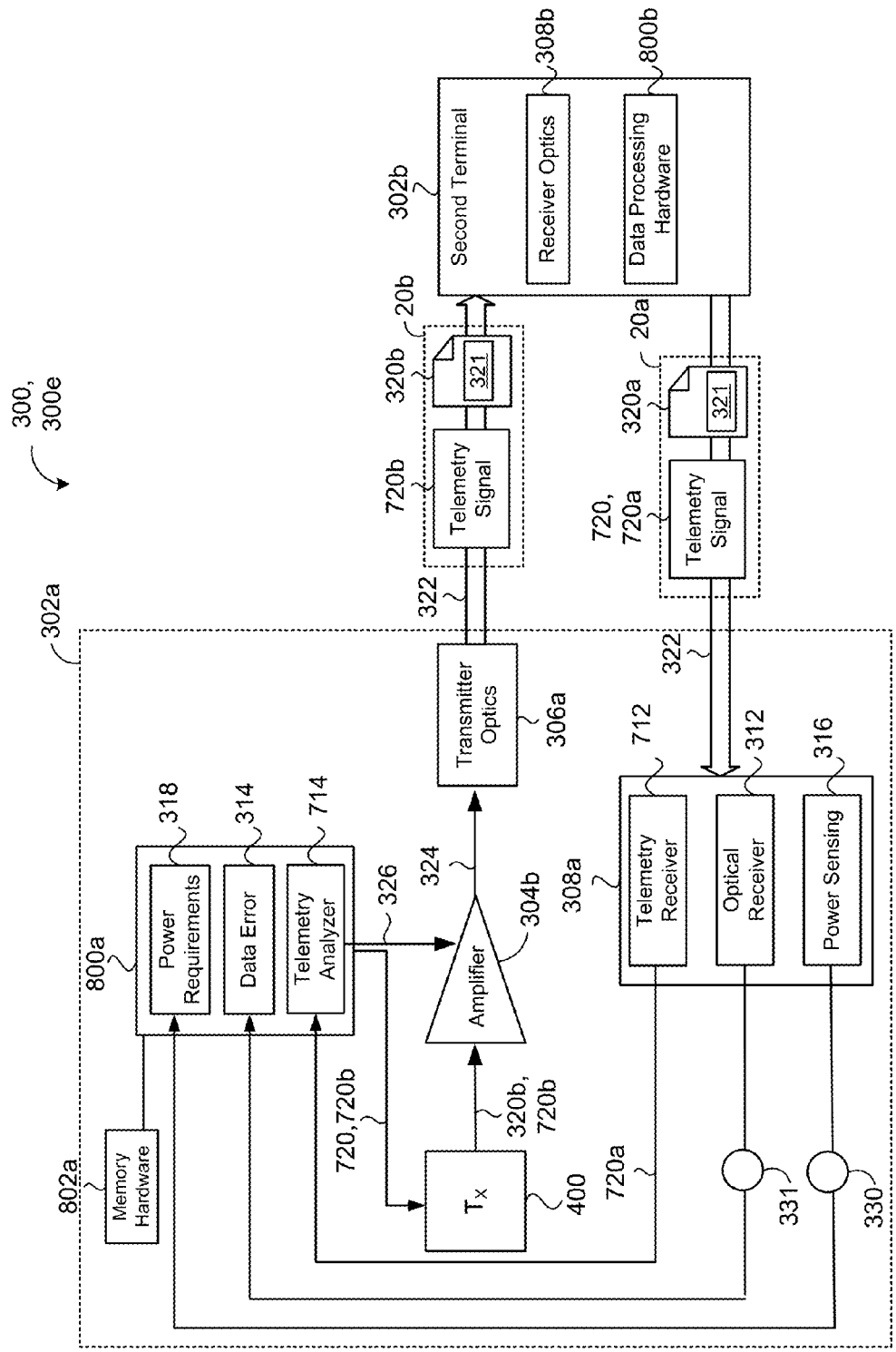

Referring to FIGS. 7A and 7B, in some implementations, a communications system 300, 300d-e provides the communications 20 between the first terminal 302a and the second terminal 302b through the free space optical link 322. Each communication 20 may include a telemetry signal 720, 720a-b and the optical signal 320. In some implementations, the receiver optics 308 at each of the terminals 302 includes the optical receiver 312, the power sensing module 316, and a telemetry receiver 712. The control hardware 800 at each of the terminals 302a, 302b may include the data error module 314, the power requirements module 318, and a telemetry analyzer 714.

In some configurations, the transmitter optics 306 couple the telemetry signal 720 and the associated optical signal 320 together when transmitting the communication 20. For example, FIG. 7A shows the terminals 302a, 302b each including an associated telemetry transmitter 706, 706a-b that transmits the telemetry signal 720 to the transmitter optics 306. The transmitter optics 306 at the transmitting one of the terminals 302 may transmit the communication 20 that includes the telemetry signal 720 and the optical signal 320 to the receiver optics 308 at the receiving one of the terminals 302. The telemetry signal 720 may include a dedicated channel different than a signal channel associated with the optical signal 320 of the communication 20.

In other configurations, the telemetry signal 720 and the optical signal 320 associated with the communication 20 are co-propagated through the optical amplifier 304 at the transmitting one of the terminals 302. For example, FIG. 7B shows the control hardware 800 providing the telemetry signal 720 to the transmitter module 400 and the transmitter module 400 co-propagating the telemetry signal 720 and the optical signal 320 of the communication 20 through the optical amplifier 304. Thus, the optical amplifier 304 may apply the output amplification 324 to the telemetry signal 720 before the transmitter optics 306 transmit the telemetry signal 720 and the optical signal 320 to the receiving one of the terminals 302.

The telemetry receiver 712 at the receiving one of the terminals 302 may receive the telemetry signal 720 included in the communication 20 from the transmitting one of the terminals 302 and provide the telemetry signal 720 to the telemetry analyzer 714 of the control hardware 800. In some implementations, the telemetry signal 720 provides the receiving power 326 for the optical link 322 at the transmitting one of the terminals 302. The optical amplifier 304 may receive the receiving power 326 from the telemetry analyzer 714 and adjust the output amplification 324 to provide a subsequently transmitted optical signal 320 with the minimum transmission power 310 for maintaining the optical link. 322.

In some implementations, the optical receiver 312 determines the received number of packets 331 associated with the data 321 when the receiving one of the terminals 302 receives the communication 20 including the optical signal 320 and the telemetry signal 720. The data error module 314 at the control hardware 800 may determine the presence of the error packet rate when the received number of data packets 331 is less than the total number of packets associated with the data 321. When the error packet rate is present, the control hardware 800 may determine the receiving power 326 for the optical link 322 at the receiving one of the terminals 302 and convert the receiving power 326 into a subsequent telemetry signal 720 for transmission to the other terminal 302.

Additionally or alternatively, the power sensing module 316 may determine the received optical power 330 of the optical signal 320 when the receiving one of the terminals 302 receives the communication 20 including the optical signal 320 and the telemetry signal 720. The power requirements module 318 may receive the received optical power 330 from the power sensing module 316 and determine the receiving power 326 for the optical link 322 at the receiving one of the terminals 302 based on the received optical power 330. In some examples, the control hardware 800 at the receiving one of the terminals 302 converts the receiving power 326 into a subsequent telemetry signal 720 for transmission to the other terminal 302.

In some implementations, the transmitter optics 306b at the second terminal 302b transmits the first communication 20a including the first optical signal 320a and a first telemetry signal 720a through the optical link 322 to the receiver optics 308a at the first terminal 302a. In some examples, the telemetry receiver 712 provides the first telemetry signal 720a to the telemetry analyzer 714 at the control hardware 800a and the telemetry analyzer 714 determines the receiving power 326 for the optical link 322 at the second terminal 302b based on the first telemetry signal 720a. In other words, the control hardware 800a at the first terminal 302a receives air scintillation feedback corresponding to the receiving power 326 for the optical link 322 at the second terminal 302b based on an optical signal 320 previously transmitted from the first terminal 302a to the second terminal 302b. In scenarios when the receiving power 326 at the second terminal 302b is less than the threshold receiving power, the optical amplifier 304a may increase the output amplification 324 at the first terminal 302a to increase the minimum transmission power 310 for maintaining the optical link 322 when the transmitter optics 306a transmit the second optical signal 320b to the second terminal 302b. Accordingly, increasing the output amplification 324 at the first terminal 302a causes an increase in the receiving power 326 for the optical link 322 at the second terminal 302b to compensate for fluctuations in the air scintillation.

Conversely, in scenarios when the receiving power 326 at the second terminal 302b exceeds the threshold receiving power, and is therefore excessive, the optical amplifier 304a may decrease the output amplification 324 at the first terminal 302a to decrease the minimum transmission power 310 for maintaining the optical link 322 when the transmitter optics 306a transmit the second optical signal 320b to the second terminal 302b. Accordingly, decreasing the output amplification 324 at the first terminal 302a causes a decrease in the receiving power 326 for the optical link 322 at the second terminal 302b to account for reductions in the air scintillation.

In some implementations, the control hardware 800a at the first terminal 302a concurrently determines the receiving power 326 for the optical link 322 at the first terminal 302a based on the first optical signal 320a received from the second terminal 302b. In some examples, the power requirements module 318 receives the received optical power 330 of the first optical signal 320a from the power sensing module 316 and determines the receiving power 326 for the optical link 322 at the first terminal 302a. The control hardware 800a may convert the receiving power 326 for the optical link 322 at the first terminal 302a into a second telemetry signal 720b and the transmitter optics 306a may transmit a second communication 20b including the second optical signal 320b and the second telemetry signal 720b to the second terminal 302b. Accordingly, the second telemetry signal 720b provides the control hardware 800b at the second terminal 302b with air scintillation feedback corresponding to the receiving power 326 for the optical link 322 at the first terminal 302a based on the first optical signal 320a previously transmitted by the second terminal 302b.

The telemetry signals 720 provide each terminal 302 with air scintillation feedback based upon the optical signal 320 previously transmitted by the terminal 302 without having to rely upon the receiving power 326 for the optical link 322 associated with optical signals 320 received from the other terminal 302. Therefore, the communication systems 300d, 300e using the telemetry signals 720 to provide air scintillation feedback do not require that the terminals 302 be reciprocal with each other when determining the receiving power 326 for the optical link 322 and adjusting the output amplification 324 based thereon.

Figure 8:
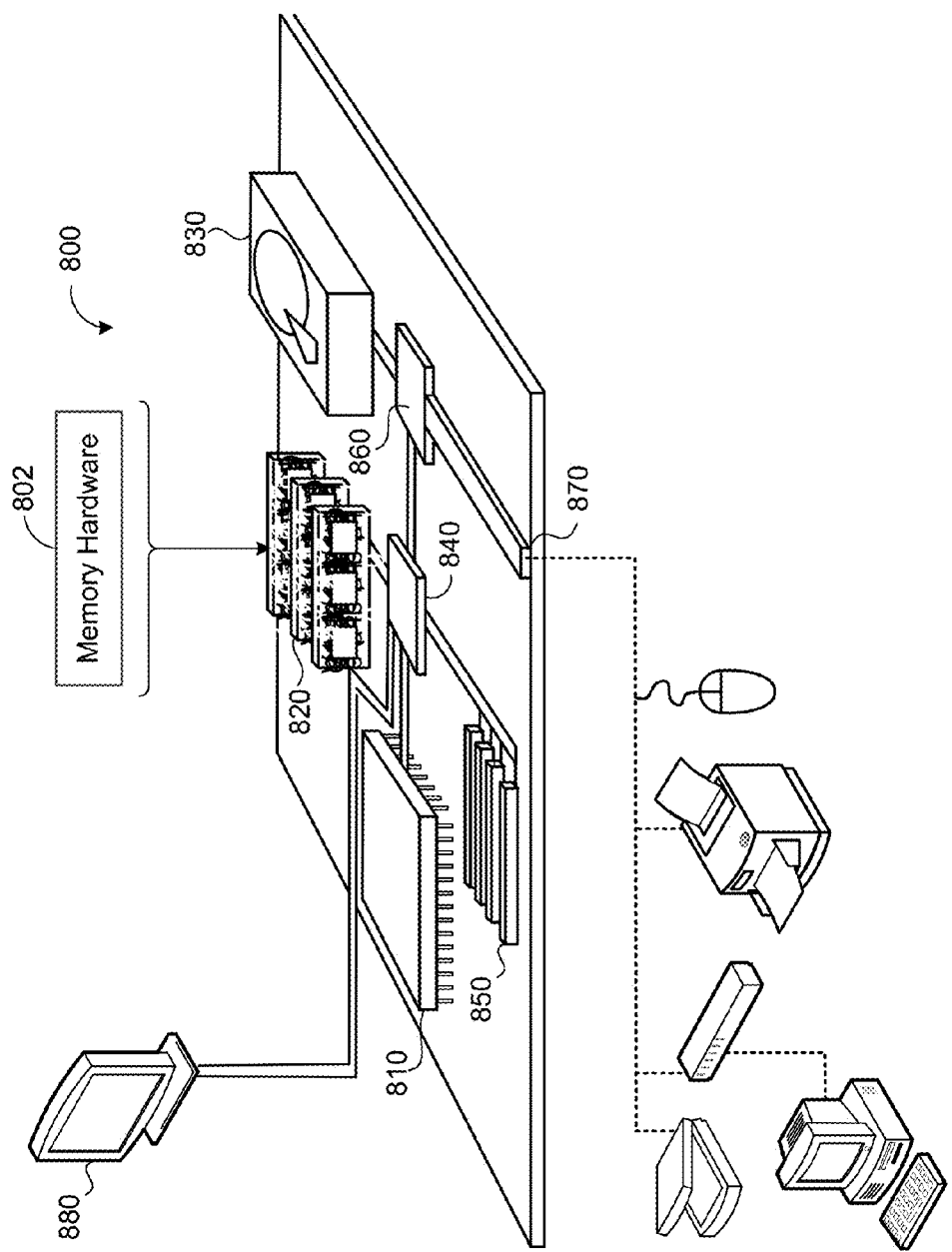
FIG. 8 is a schematic view of example control hardware of a communication terminal.

FIG. 8 is a schematic view of an example of the control hardware 800 that may be used to implement the systems and methods described in this document. The control hardware 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 800 includes a processor 810, memory 820, a storage device 830, a high-speed interface/controller 840 connecting to the memory 820 and high-speed expansion ports 850, and a low speed interface/controller 860 connecting to a low speed bus 870 and storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a GUI on an external input/output device, such as a display 880 coupled to a high speed interface 840. In other implementations, multiple processors and/or multiple buses may be used, as appropriate, along with multiple memories and types of memory. Also, multiple control hardware devices 800 may be connected, with each device providing portions of the necessary operations (e.g., as a server bank, a group of blade servers, or a multi-processor system).

The memory 820 includes hardware that stores information non-transitorily within the control hardware 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the control hardware 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 830 is capable of providing mass storage for the control hardware 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and low-speed expansion port 870. The low-speed expansion port 870, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The control hardware 800 may be implemented in a number of different forms, as shown in the figure. For example, it may be implemented as a standard server or multiple times in a group of such servers, as a laptop computer, or as part of a rack server system. In other implementations, the control hardware includes a field programmable gate array (FGPA), a digital signal processor (DSP), or any other suitable circuitry.

In some implementations, the control hardware 800 is in communication with memory hardware 802 (e.g., in the memory 820). The control hardware 800 at the first communication terminal 302a may determine the receiving power 326 for the optical link 322 based on the first optical signal 320a received from the second communication terminal 302b through the optical link 322. In some examples, the control hardware 800 adjusts the output amplification 324 at the first communication terminal 302a based on the receiving power 326 for the optical link 322. For instance, the output amplification 324 may be adjusted to provide the second optical signal 320b with a minimum transmission power 310 for maintaining the optical link 322. Thereafter, the first terminal 302a may transmit the second optical signal 320b to the second communication terminal 302b through the optical link 322.

A software application (i.e., a software resource 110s) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110hm may be physical devices used to store programs (e.g., sequences of instructions) or data (e.g., program state information) on a temporary or permanent basis for use by a computing device 110hc. The non-transitory memory 110hm may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 9:
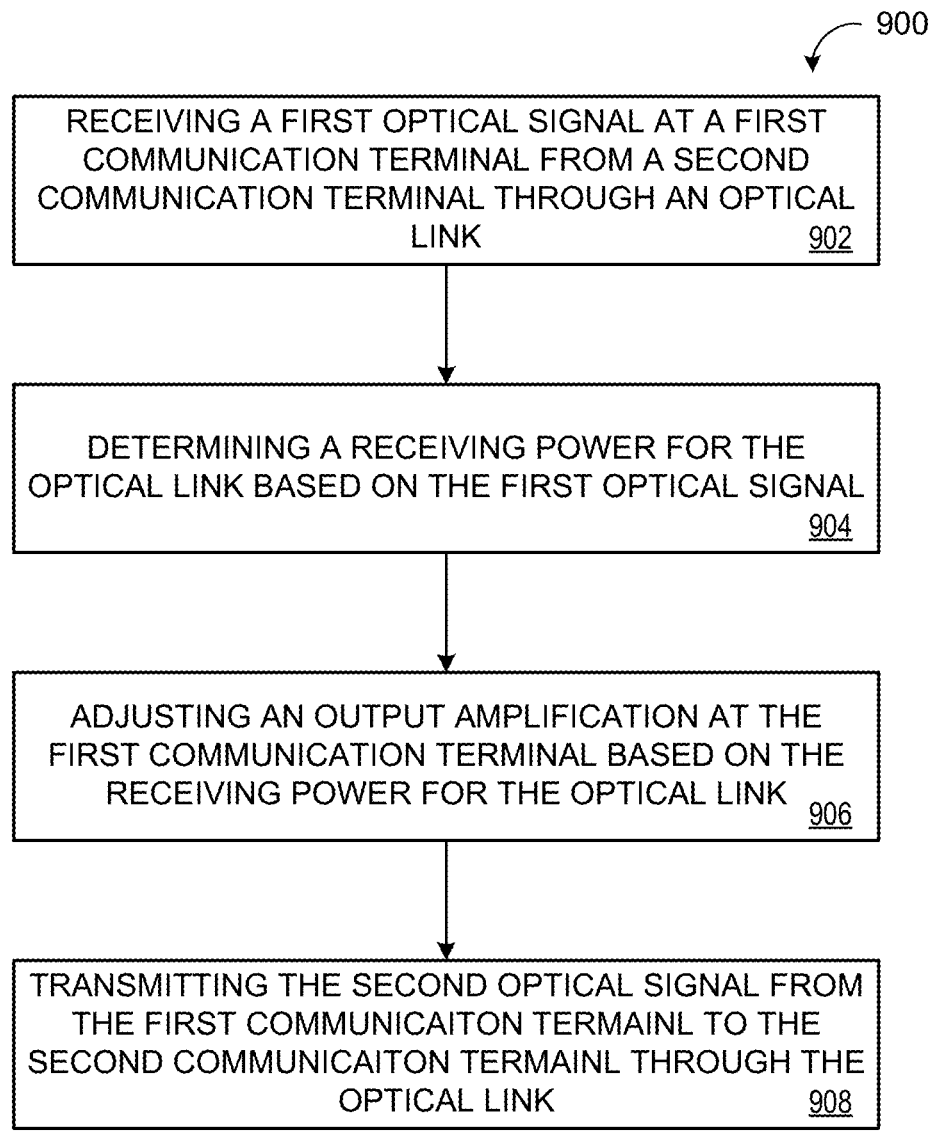
FIG. 9 is a flowchart of an example method for determining a receiving power for a free space optical link at a communication terminal.

FIG. 9 is a flow chart of an example method 900 for adjusting an output amplification 324 at the first communication terminal 302a based upon the receiving power 326 for the free space optical link 322. The flowchart starts at operation 902 where the first communication terminal 302a receives the first optical signal 320a from the second communication terminal 302b through the optical link 322. At operation 904, the control hardware 800a at the first terminal 302a determines the receiving power 326 for the optical link 322 based on the first optical signal 320a. In some examples, the control hardware 800a of the communication system 300b of FIG. 5 determines the receiving power 326 for the optical link 322 based on an optical power 330 of the first optical signal 320a when the first communication terminal 302a receives the first optical signal 320a. Additionally or alternatively, the control hardware 800a of the communication system 300b of FIG. 5 may determine the receiving power 326 for the optical link 322 based on an error rate of data packets 321 associated with the first optical signal 320a. In other examples, the control hardware 800a of the communication system 300c of FIG. 6 determines the receiving power 326 for the optical link 322 based on a received power 630 of a laser diode signal 620 received from the second communication terminal 302b. In some implementations, the control hardware 800a of the communication systems 300d-e of FIGS. 7A and 7B, respectively, determine the receiving power 326 for the optical link 322 based on a first telemetry signal 720a received from the second communication terminal 302b that provides the receiving power 326 for the optical link 322 at the second communication terminal 302b. In these implementations, the control hardware 800a may concurrently determine the receiving power for the optical link 322 at the first communication terminal 302a based on at least one of the received optical power 330 of the first optical signal 320a or the error rate of data packets 321 associated with the first optical signal 320a.

At operation 906, the control hardware 800a adjusts the output amplification 324 at the first communication terminal 302a based on the receiving power 326 for the optical link 322. Here, the output amplification 324 may be adjusted by the optical amplifier 304a to provide the second optical signal 320b with a minimum transmission power for maintaining the optical link 322 and compensating for fluctuations in air scintillation. At operation 908, the first communication terminal 302a transmits the second optical signal 320b to the second communication terminal 302b through the optical link 322. Accordingly, the adjusted output amplification 324 at the first terminal 302a is operative to regulate the receiving power 326 for the optical link 322 when the second communication terminal 302b receives the second optical signal 320b.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a sewer transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving, at a first communication terminal, a first optical signal from a second communication terminal through a free space optical link;
determining, by control hardware of the first communication terminal, a receiving power for the optical link at the first communication terminal based on the received first optical signal;
adjusting, by the control hardware, an output amplification at the first communication terminal using the receiving power for the optical link at the first communication terminal, the output amplification adjusted to provide a second optical signal with a minimum transmission power for maintaining the optical link; and
transmitting the second optical signal from the first communication terminal to the second communication terminal through the optical link,
wherein when transmitting the second optical signal from the first communication terminal to the second communication terminal, transmitting a telemetry signal from the first communication terminal to the second communication terminal through the optical link, the telemetry signal providing the receiving power for the optical link at the first communication terminal based on at least one of:
   a received optical power of the first optical signal; or
   an error rate of data packets associated with the first optical signal, and
wherein the telemetry signal and the second optical signal are co-propagated through an optical amplifier at the first communication terminal prior to transmitting the second optical signal and the telemetry signal to the second communication terminal.

2. The method of claim 1, wherein determining the receiving power for the optical link is based on an optical power of the first optical signal when the first communication terminal receives the first optical signal.

3. The method of claim 1, wherein determining the receiving power for the optical link is based on an error rate of data packets associated with the first optical signal.

4. The method of claim 1, further comprising:
   when receiving the first optical signal:
      receiving a laser diode signal at the first communication terminal from a laser diode of the second communication terminal through the optical link; and
      determining, by the control hardware, a received power of the laser diode signal; and
      determining, by the control hardware, the receiving power for the optical link at the first communication terminal based on the received power of the laser diode signal.

5. The method of claim 4, wherein the second communication terminal transmits the laser diode signal from the laser diode at a constant output power.

6. The method of claim 5, further comprising, when the received power of the laser diode signal differs from the constant output power of the laser diode, adjusting, by the control hardware, the output amplification at the first communication terminal by an amount based on the difference between the received power of the laser diode signal and the constant output power of the laser diode.

7. The method of claim 4, wherein the second communication terminal transmits the laser diode signal from the laser diode at a wavelength outside a gain bandwidth associated with the first optical signal.

8. The method of claim 1, wherein the telemetry signal comprises a dedicated channel different than a signal channel associated with the second optical signal.

9. The method of claim 1, wherein adjusting the output amplification at the first communication terminal comprises:
   when the receiving power for the optical link at the first communication terminal is less than a threshold receiving power:
      increasing the output amplification at the first communication terminal to increase the receiving power for the optical link when the second communication terminal receives the second optical signal; or
   when the receiving power for the optical link at the first communication terminal is greater than the threshold receiving power:
      decreasing the output amplification at the first communication terminal to decrease the receiving power for the optical link when the second communication terminal receives the second optical signal.

10. The method of claim 9, wherein decreasing the output amplification comprises decreasing the output amplification at a rate that avoids oscillations when the first communication terminal transmits the second optical signal.

11. The method of claim 1, wherein the first communication terminal or the second communication terminal comprises a high-altitude platform.

12. The method of claim 1, wherein the first communication terminal and the second communication terminal operate at a common altitude above the earth while maintaining a line of sight between each other.

13. A high altitude platform comprising:
   receiver optics configured to receive a first optical signal from another high altitude platform through a free space optical link;
   transmitter optics configured to transmit a second optical signal to the other high altitude platform through the optical link, wherein the transmitter optics, when transmitting the second optical signal to the other high altitude platform, transmit a telemetry signal to the other high altitude platform through the optical link, the telemetry signal providing the receiving power for the optical link at the high altitude platform based on at least one of:
      a received optical power of the first optical signal; or
      an error rate of data packets associated with the first optical signal;
   control hardware in communication with the receiver optics and the transmitter optics, the control hardware configured to:
      determine a receiving power for the optical link at the receiver optics based on the received first optical signal; and
      adjust an output amplification at the transmitter optics using the receiving power for the optical link at the receiver optics, the output amplification adjusted to provide the second optical signal with a minimum transmission power for maintaining the optical link; and
   an optical amplifier in communication with the control hardware and the transmitter optics, the optical amplifier configured to co-propagate the telemetry signal and the second optical signal prior to the transmitter optics transmitting the telemetry signal and the second optical signal to the other high altitude platform.

14. The high altitude platform of claim 13, wherein the control hardware determines the receiving power for the optical link based on at least one of:
   an optical power of the first optical signal when the receiver optics receive the first optical signal; or
   an error packet rate of data packets associated with the first optical signal when the receiver optics receive the first optical signal.

15. The high altitude platform of claim 13, wherein:
   the receiver optics, when receiving the first optical signal, are configured to receive a laser diode signal from a laser diode of the other high altitude platform through the optical link; and
   the control hardware is configured to determine a received power of the laser diode signal and determine the receiving power for the optical link at the receiver optics based on the received power of the laser diode signal.

16. The high altitude platform of claim 15, further comprising an optical amplifier in communication with the control hardware and the transmitter optics, the optical amplifier configured to adjust the output amplification at the high altitude platform by an amount based on a difference between the received power of the laser diode signal and a constant output power of the laser diode signal when the laser diode at the other high altitude platform transmits the laser diode signal.

17. The high altitude platform of claim 13, further comprising a telemetry transmitter in communication with the control hardware and the transmitter optics, the telemetry transmitter providing the telemetry signal with a dedicated channel different than a signal channel associated with the second optical signal.

18. The high altitude platform of claim 13, further comprising an optical amplifier in communication with the control hardware and the transmitter optics, the optical amplifier configured to:
when the receiving power for the optical link at the receiver optics is less than a threshold receiving power:
increase the output amplification at the transmitter optics to increase the receiving power for the optical link when the other high altitude platform receives the second optical signal; or
when the receiving power for the optical link at the receiver optics is greater than the threshold receiving power:
decrease the output amplification at the transmitter optics to decrease the receiving power for the optical link when the other high altitude platform receives the second optical signal.

19. The high altitude platform of claim 18, wherein the optical amplifier is configured to decrease the output amplification at a rate that avoids oscillations when the transmitter optics transmit the second optical signal.

20. A communication system comprising:
a first communication terminal comprising:
first receiver optics configured to receive a first optical signal through a free space optical link;
first transmitter optics configured to transmit a second optical signal and a telemetry signal through the optical link, the telemetry signal providing a receiving power for the optical link at the first communication terminal based on at least one of:
a received optical power of the first optical signal; or
an error rate of data packets associated with the first optical signal;
first control hardware in communication with the first receiver optics and the first transmitter optics, the control hardware configured to:
determine a receiving power for the optical link at the first communication terminal based on the received first optical signal; and
adjust an output amplification at the first transmitter optics using the receiving power for the optical link at the first communication terminal, the output amplification adjusted to provide the second optical signal with a minimum transmission power for maintaining the optical link; and
an optical amplifier in communication with the first control hardware and the first transmitter optics, the optical amplifier configured to co-propagate the telemetry signal and the second optical signal prior to the first transmitter optics transmitting the telemetry signal and the second optical signal through the optical link; and
a second communication terminal comprising:
second receiver optics configured to receive the second optical signal and the telemetry signal from the first transmitter optics through the optical link;
second transmitter optics configured to transmit the first optical signal to the first receiver optics through the optical link; and
second control hardware in communication with the first receiver optics and the first transmitter optics, the control hardware configured to:
determine a receiving power for the optical link based on the second optical signal; and
adjust an output amplification at the second transmitter optics based on the receiving power for the optical link, the output amplification adjusted to provide a subsequent optical signal for transmission from the second transmitter optics with a minimum transmission power for maintaining the optical link.

21. The communication system of claim 20, wherein at least one of the first or second control hardware determines the receiving power for the optical link based on at least one of:
an optical power of the associated one of the first or second optical signals when the associated one of the first or second receiver optics receives the associated one of the first or second optical signals; or
an error packet rate of data associated with the associated one of the first or second optical signals when the associated one of the first or second receiver optics receives the associated one of the first or second optical signals.

22. The communication system of claim 20, wherein:
one of the first or second receiver optics of the associated one of the first or second communication terminals, when receiving the associated one of the first or second optical signals, are configured to receive a laser diode signal from a laser diode of the other one of the first or second communication terminals; and
one of the first or second control hardware associated with the one of the first or second receiver optics that receives the laser diode signal is configured to determine a received power of the laser diode signal and determine the receiving power for the optical link based on the received power of the laser diode signal.

23. The communication system of claim 20, wherein the first and second communication terminals comprise high altitude platforms operating at a common altitude above the earth while maintaining a line of sight between each other.

* * * * *